(12) United States Patent
Henderson

(10) Patent No.: US 9,396,464 B2
(45) Date of Patent: Jul. 19, 2016

(54) UPDATING MULTI-MEDIA CONTENT IN A DIGITAL DOWNLOAD KIOSK

(75) Inventor: James Henderson, Fife (GB)

(73) Assignee: NCR Corporation, Duluth, GA (US)

( * ) Notice: Subject to any disclaimer, the term of this patent is extended or adjusted under 35 U.S.C. 154(b) by 659 days.

(21) Appl. No.: 12/881,222

(22) Filed: Sep. 14, 2010

(65) Prior Publication Data

US 2012/0066462 A1    Mar. 15, 2012

(51) Int. Cl.
| | | |
|---|---|---|
| *G06F 12/00* | (2006.01) | |
| *G06F 13/00* | (2006.01) | |
| *G06F 13/28* | (2006.01) | |
| *G06Q 20/12* | (2012.01) | |
| *G07F 17/16* | (2006.01) | |

(52) U.S. Cl.
CPC .............. *G06Q 20/123* (2013.01); *G07F 17/16* (2013.01)

(58) Field of Classification Search
CPC ............................... G06Q 20/123; G07F 17/16
USPC .................................................. 711/159, 163
See application file for complete search history.

(56) References Cited

U.S. PATENT DOCUMENTS

| | | | | |
|---|---|---|---|---|
| 5,760,917 | A * | 6/1998 | Sheridan ........................ | 358/442 |
| 7,096,504 | B1 * | 8/2006 | Tagawa et al. ................... | 726/27 |
| 7,143,290 | B1 * | 11/2006 | Ginter et al. ................... | 713/176 |
| 7,599,854 | B1 * | 10/2009 | Baum ................. | G03D 15/005 705/26.1 |
| RE42,019 | E * | 12/2010 | Tagawa et al. ................... | 726/27 |
| 2002/0105658 | A1 * | 8/2002 | Jackson et al. ................... | 358/1.2 |
| 2002/0188509 | A1 * | 12/2002 | Ariff et al. ........................ | 705/14 |
| 2002/0194068 | A1 * | 12/2002 | Bishop et al. ................... | 705/14 |
| 2002/0199208 | A1 * | 12/2002 | Chang et al. .................... | 725/131 |
| 2003/0084313 | A1 * | 5/2003 | Tada .............................. | 713/193 |
| 2003/0161003 | A1 * | 8/2003 | Herbert .......................... | 358/1.18 |
| 2003/0236987 | A1 * | 12/2003 | Griffin et al. ................... | 713/189 |
| 2004/0015427 | A1 * | 1/2004 | Camelio .......................... | 705/35 |
| 2004/0204985 | A1 * | 10/2004 | Gibson et al. ................... | 705/14 |
| 2004/0236944 | A1 * | 11/2004 | Walker et al. ................... | 713/161 |
| 2005/0171661 | A1 * | 8/2005 | Abdel-Malek et al. .......... | 701/33 |
| 2005/0209927 | A1 * | 9/2005 | Aaltonen et al. ................. | 705/26 |
| 2006/0028398 | A1 * | 2/2006 | Willmore ........................ | 345/2.3 |
| 2006/0031826 | A1 * | 2/2006 | Hiramatsu et al. ............. | 717/168 |
| 2006/0129465 | A1 * | 6/2006 | Sailus et al. ..................... | 705/26 |
| 2006/0219776 | A1 * | 10/2006 | Finn ............................... | 235/380 |
| 2007/0099683 | A1 * | 5/2007 | Panther Trice et al. ........... | 463/1 |
| 2007/0225068 | A1 * | 9/2007 | Weiss ............................... | 463/25 |
| 2007/0233613 | A1 * | 10/2007 | Barrus et al. ...................... | 705/71 |
| 2007/0288715 | A1 * | 12/2007 | Boswell et al. ................ | 711/164 |
| 2008/0247543 | A1 * | 10/2008 | Mick et al. ...................... | 380/201 |
| 2008/0250120 | A1 * | 10/2008 | Mick et al. ...................... | 709/219 |
| 2008/0288106 | A1 * | 11/2008 | Widergren et al. ............ | 700/234 |
| 2009/0076934 | A1 * | 3/2009 | Shahbazi et al. ................ | 705/30 |
| 2009/0094597 | A1 * | 4/2009 | Moskalik et al. .............. | 717/174 |

(Continued)

Primary Examiner — Sheng-Jen Tsai
(74) Attorney, Agent, or Firm — Paul W. Martin; Schwegman, Lundberg & Woessner

(57) ABSTRACT

A method of updating multi-media content at a digital download kiosk is described. The method comprises receiving a secure portable storage device into a portable device reader/writer in the kiosk; reading the secure portable storage device to ascertain if authorized multi-media content is stored thereon; uploading the multi-media content from the secure portable storage device to a data store accessible by the kiosk; and indicating when the multi-media content has been uploaded. The portable storage device may have been received by mail from a supplier, and the method may further comprise removing the portable storage device from the portable storage device reader/writer, and returning the removed portable storage device to the supplier by mail.

11 Claims, 3 Drawing Sheets

(56) References Cited

U.S. PATENT DOCUMENTS

| | | | |
|---|---|---|---|
| 2009/0113116 A1* | 4/2009 | Thompson et al. | 711/103 |
| 2009/0119185 A1* | 5/2009 | Heins | 705/26 |
| 2010/0050274 A1* | 2/2010 | Miki et al. | 726/29 |
| 2010/0057924 A1* | 3/2010 | Rauber et al. | 709/229 |
| 2010/0083303 A1* | 4/2010 | Redei et al. | 725/32 |
| 2010/0088524 A1* | 4/2010 | Ford et al. | 713/189 |
| 2010/0100233 A1* | 4/2010 | Lu | 700/226 |
| 2010/0157095 A1* | 6/2010 | Karn et al. | 348/231.1 |
| 2010/0174993 A1* | 7/2010 | Pennington et al. | 715/738 |
| 2010/0253788 A1* | 10/2010 | Okano | 348/207.1 |
| 2010/0269146 A1* | 10/2010 | Britt | 725/110 |
| 2010/0332724 A1* | 12/2010 | Widergren et al. | 711/102 |
| 2011/0282733 A1* | 11/2011 | Gnanasambandam et al. | 705/14.44 |
| 2012/0011540 A1* | 1/2012 | Pulford | 725/32 |
| 2012/0159518 A1* | 6/2012 | Boliek et al. | 719/318 |
| 2013/0151364 A1* | 6/2013 | Reed et al. | 705/26.1 |
| 2013/0275505 A1* | 10/2013 | Gauglitz et al. | 709/204 |
| 2014/0014720 A1* | 1/2014 | Sarkis et al. | 235/382 |

\* cited by examiner

UPDATING MULTI-MEDIA CONTENT IN A DIGITAL DOWNLOAD KIOSK

FIELD OF INVENTION

The present invention relates to improvements in or relating to updating multi-media content in a digital download kiosk.

BACKGROUND OF INVENTION

A digital download kiosk enables a customer to select, pay for, and then download multi-media content (such as a movie, an audio file, or a video game) to a portable storage device (such as a non-volatile memory card). Once the multi-media content has been downloaded, the portable storage device can be inserted into a suitable reader coupled to a playback device (such as a computer or a television) to allow the customer to view the downloaded multi-media content either indefinitely (if the customer bought the content) or for a limited time period (if the customer rented the content).

Multi-media content is protected by digital rights management (DRM) protection techniques to prevent unauthorized copying thereof.

One popular type of multi-media content available at a kiosk is a movie (sometimes referred to as a cinematographic film, or a motion picture). Each movie file is comparatively large (typically at least two Gigabytes per movie for standard resolution, and much more for high resolution).

Customers like to be able to choose from a large range of movies when using a digital download kiosk. This means that it is desirable to be able to access a large catalogue of movies (and potentially other multi-media content). It is not currently practical to store a large number of different movies in a kiosk, so digital download kiosks are typically connected to a content server, which is typically co-located in the same retail outlet as the digital download kiosk. The content server is typically connected by a high bandwidth communications channel (such as T1 or ADSL connection) to a remote authorization database to receive updated movies therefrom. Movies can then be transferred from the content server to the kiosk in response to a customer's selection.

This arrangement has the disadvantage that the kiosk owner or operator has to pay for expensive, high bandwidth, communication lines between the content server and the remote authorization database. If a large number of new movies are released at the same time, then it is not practical to update the content server using the high bandwidth communications channel. Instead, a service engineer is usually dispatched to the retail location housing the kiosk, with a disk drive containing the updated content. The service engineer transfers the updated content to the content server using the disk drive. This is costly, time-consuming, and can lead to failures because of damage to the electro-mechanical components within the disk drive.

SUMMARY OF INVENTION

Accordingly, the invention generally provides methods, systems, apparatus, and software for updating multi-media content in a digital download kiosk by reading multi-media content from a portable storage device presented directly to the kiosk.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of updating multi-media content at a digital download kiosk, the method comprising:

receiving a secure portable storage device into a portable device reader/writer in the kiosk;

reading the secure portable storage device to ascertain if authorized multi-media content is stored thereon;

uploading the multi-media content from the secure portable storage device to a data store accessible by the kiosk; and indicating when the multi-media content has been uploaded.

The method may comprise the further steps of:

prior to the uploading step, ascertaining the amount of storage space required on the data store accessible by the kiosk to enable uploading of the authorized multi-media content;

in the event of insufficient storage space on the data store, deleting currently stored multi-media content from the data store according to a deletion criterion to free up the amount of storage space required for the authorized multi-media content.

The step of receiving a secure portable storage device into a portable device reader/writer in the kiosk may comprise receiving a secure, solid state, non-volatile memory card, such as a secure FLASH memory card.

The step of reading the secure portable storage device to ascertain if authorized multi-media content is stored thereon may include ascertaining if the multi-media content stored thereon includes digital rights management (DRM) technology identical to the DRM technology used by the currently stored multi-media content.

The step of reading the secure portable storage device to ascertain if authorized multi-media content is stored thereon may include accessing a serial number of the portable storage device and comparing the accessed serial number with serial numbers previously notified to the kiosk and associated with multi-media content expected by the kiosk.

The method may comprise the further step of informing a remote authorization database if an expected secure portable storage device has not been received within a predefined time period of receiving notification that a portable storage device having that serial number has been sent to the kiosk.

The step of reading the secure portable storage device to ascertain if authorized multi-media content is stored thereon may include ascertaining if the multi-media content stored on the portable storage device is protected using predefined cryptographic techniques. The predefined cryptographic techniques may include using a predefined encryption key and/or including a hash value for each file and/or for all files stored on the secure portable storage device.

The step of reading the secure portable storage device may include using the same portable device reader/writer to read the portable storage device as is used to write multi-media content to a portable storage device provided by a customer.

The data store accessible by the kiosk may be located within the kiosk. Alternatively, the data store accessible by the kiosk may be located in a content server connected to the kiosk. The content server may be connected to the kiosk by a network.

The step of ascertaining the amount of storage space required on a data store to enable uploading of the authorized multi-media content may comprise reading header data relating to each file included in the authorized multi-media content.

The step of ascertaining the amount of storage space required on the data store may include comparing file names (and optionally file sizes) in the authorized multi-media content with file names (and optionally file sizes) of multi-media content stored in the data store to ascertain if a file is already stored in the data store, and therefore does not need to be copied from the secure portable storage device to the data store.

The deletion criterion may comprise one or more of the following: (a) deleting a file in the multi-media content in the data store that was downloaded to a customer least recently; (b) deleting a file in the multi-media content in the data store that (i) is older than a preset time period (for example, four weeks) and (ii) has been downloaded to a customer a fewer number of times than all other files of that age; (c) deleting a file in the multi-media content based on the provider of the multi-media content in a file; and/or (d) deleting a file in the multi-media content in the data store based on the genre of the multi-media content in that file and the genres of other files in the data store.

The step of uploading the authorized multi-media content from the portable storage device to the data store in the kiosk may include updating a catalogue stored in the kiosk that lists the multi-media content available for purchase from that kiosk. The step of updating a catalogue stored in the kiosk may include retrieving information about each multi-media content file, such as title, actors, length, viewer classification, genre, and the like. Alternatively, a catalogue of titles available at that kiosk may be provided by the remote authorization database.

The step of indicating when the authorized multi-media content has been uploaded may further comprise presenting a screen on a display of the kiosk informing a user who inserted the secure portable storage device that the multi-media content has been successfully transferred to the kiosk.

The method may comprise the further step of deleting the authorized multi-media content from the portable storage device.

The method may further comprise removing the portable storage device from the portable storage device reader/writer, and returning the removed portable storage device to a supplier (for example, by mail, or by handing the removed portable storage device to a service engineer next time the service engineer visits the kiosk).

According to a second aspect there is provided a method of updating multi-media content at a digital download kiosk, the method comprising:

receiving by mail a secure storage device including multiple multi-media content files for uploading to a digital download kiosk;

inserting the received secure storage device into the digital download kiosk;

waiting for the digital download kiosk to validate the contents of the inserted secure storage device and transfer the contents of the inserted secure storage device to a data store accessible by the kiosk;

removing the inserted secure storage device from the kiosk; and sending the removed secure storage device by mail to a nominated recipient.

The nominated recipient may be the same entity that mailed the secure storage device, or a different entity.

The digital download kiosk may validate the contents of the inserted secure storage device by validating that the secure storage device has a serial number corresponding to a serial number expected by the digital download kiosk.

By virtue of these aspects, a catalogue of multi-media content on a digital download kiosk can be updated without requiring a high bandwidth connection between the kiosk and a multi-media content provider.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
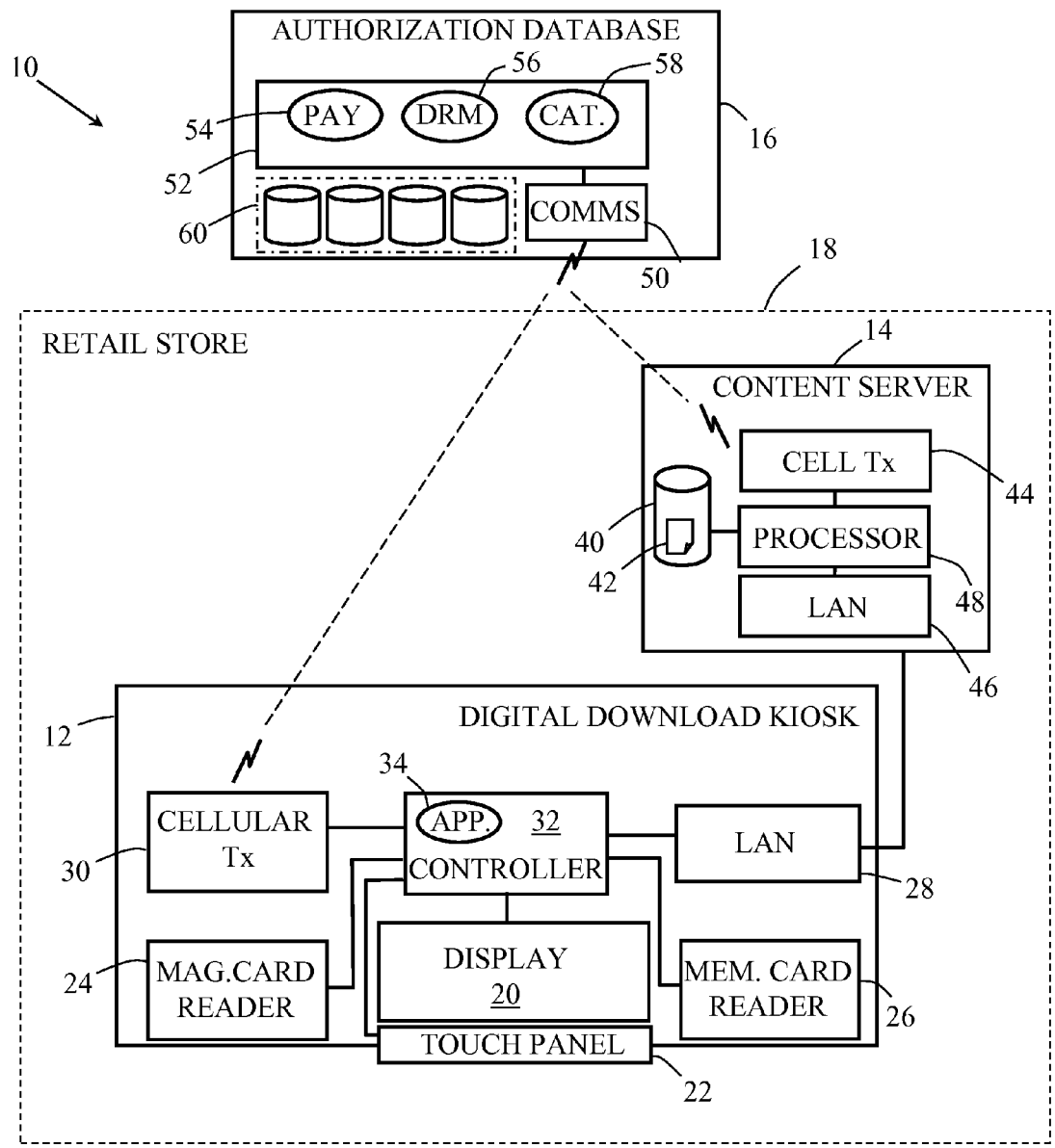
FIG. 1 is a simplified schematic diagram of a digital download kiosk system enabling updating of multi-media content therein according to one embodiment of the present invention.

Reference is first made to FIG. 1, which is a simplified schematic diagram of a digital download kiosk system 10. The system 10 comprises a digital download kiosk 12 coupled to a content server 14 by a local area network, and a remote authorization database 16. The content server 14 is co-located with the kiosk 12 in a retail establishment (illustrated by broken line 18). The retail establishment 18 is illustrated to provide context, but is not part of the system 10. The combination of the kiosk 12 and the content server 14 is referred to herein as "the local content system".

The digital download kiosk 12 comprises: a customer display 20, a touch sensitive panel 22 in registration with the display 20, a swipe magnetic card reader 24 for reading a payment card (such as a debit or credit card), a memory card reader/writer 26, a local area network (LAN) adapter 28, a cellular transceiver 30, and a controller 32 for controlling the operation of the various components within the kiosk 12. The controller 32 executes a control application 34, which is used to control the operation of the kiosk 12, as will be described in more detail below.

In this embodiment, the memory card reader/writer 26 is an SD FLASH card reader/writer for reading secure portable storage devices (in the form of SDHC FLASH cards).

The content server 14 comprises a data store 40 (configured in a RAID arrangement) for multi-media content. In this embodiment, the multi-media content comprises several thousand multi-media packages 42 (one example of which is illustrated pictorially in FIG. 1), each multi-media package 42 comprising one or more files that combine to provide a movie and optionally additional features (such as trailers, interviews, and the like).

The content server 14 further comprises: a cellular transceiver 44, a LAN adapter 46, and a processor 48 for controlling transfer of data to and from the data store 40 via the cellular transceiver 44 and/or the LAN adapter 46.

Although only one authorization database 16 and one kiosk 12 are illustrated, in practical embodiments, a single authorization database 16 may serve a network comprising a large number of kiosks 12 (the kiosk network).

The authorization database 16 comprises a communications facility 50 for communicating with the cellular transceivers 30,44, and a processor 52. The processor 52 executes: a payment authorization application 54, a digital rights management (DRM) issuance and tracking application 56, and a multi-media catalogue and inventory application 58. These applications 54,56,58 will be described in more detail below. The authorization database 16 also comprises a large data repository 60 (tens of Terabytes) storing an entire catalogue of multi-media packages that can be accessed by any kiosk 12 within the kiosk network.

Figure 2:
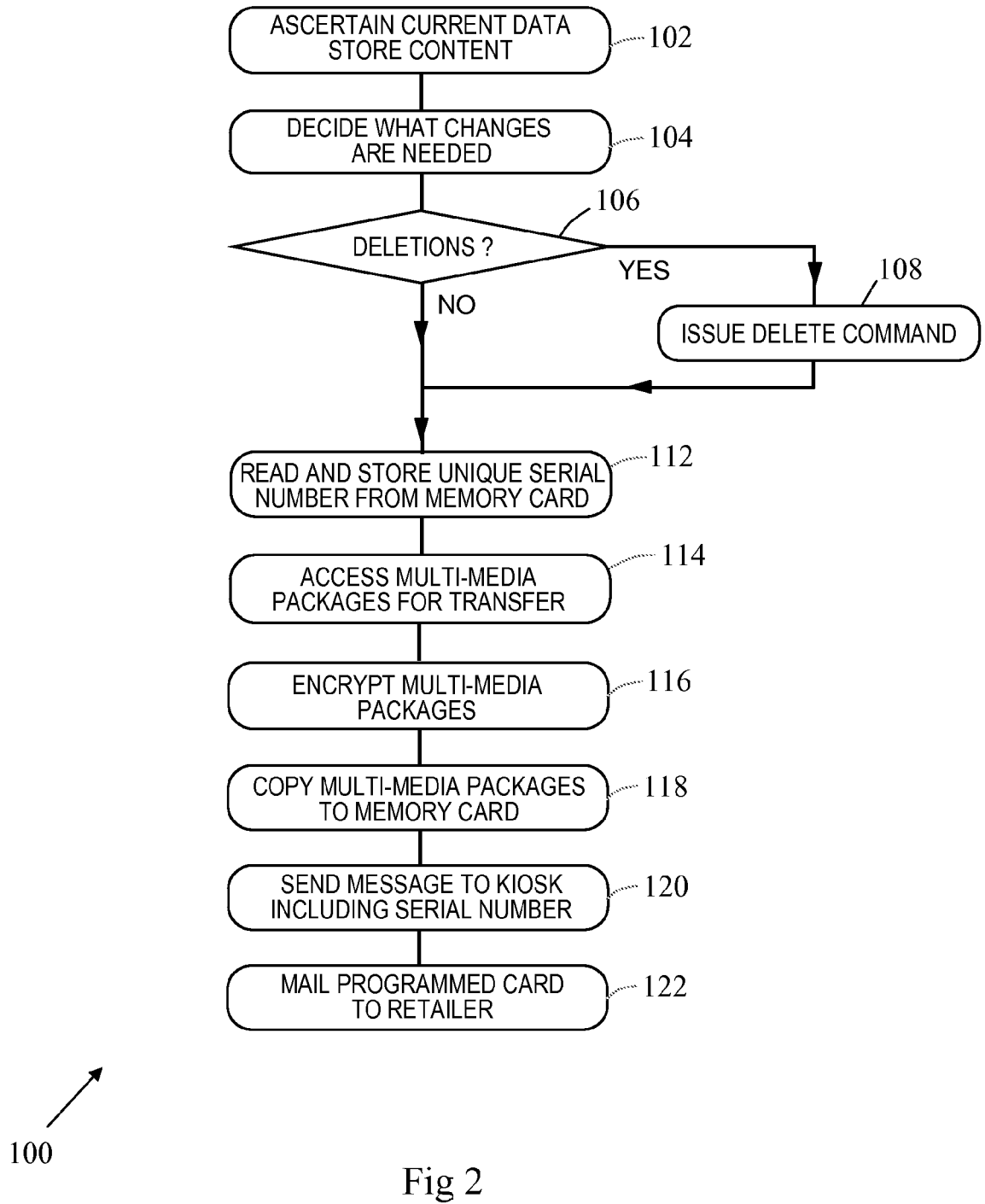
FIG. 2 is a flowchart illustrating steps implemented by or at a part (an authorization database) of the system of FIG. 1 to update multi-media content in another part (a content server) of the system of FIG. 1.

Reference will now be made to FIG. 2, which is a flowchart 100 illustrating steps implemented by or at the authorization database 16 in updating multi-media content in the content server 14.

Initially, an owner or operator of the authorization database 16 uses the catalogue and inventory application 58 to ascertain what multi-media content is stored in the data store 40 of the content server 14 (step 102). This is implemented using the communications facility 50 and the cellular transceiver 44.

The owner or operator of the authorization database 16 then decides what multi-media content should be added to the data store 40, and (if necessary to free up disk storage space) what multi-media content should be deleted from the data store 40 (step 104).

If multi-media content is to be deleted (step 106) from the data store 40, then the catalogue and inventory application 58 issues a delete command listing the relevant multi-media packages 42 to be deleted from the data store 40 (step 108), which the data store 40 receives and executes.

In any event, the owner or operator of the authorization database 16 then uses the catalogue and inventory application 58 to store multi-media packages to be transferred to the data store 40 onto a secure FLASH SDHC memory card. This is implemented in a few sequential steps.

Firstly, the catalogue and inventory application 58 reads and records a unique serial number from a secure area of the FLASH SDHC memory card (step 112). Then the catalogue and inventory application 58 accesses each of the multi-media packages to be transferred to the memory card (step 114), and encrypts these multi-media packages using AES 256 encryption (step 116). The catalogue and inventory application 58 then copies these encrypted packages to the FLASH SDHC memory card (step 118) to create a programmed card.

The multi-media packages are stored in the data repository 60 with the DRM settings prohibiting copying and playing of the multi-media packages. These settings are used for the multi-media packages that are copied to the FLASH SDHC memory card, so that even if a third party could decrypt the contents of the programmed card, he/she could not play the multi-media packages stored thereon.

The catalogue and inventory application 58 transmits a message to the kiosk 12 (via the communications facility 50 and the cellular transceiver 30) informing the kiosk 12 of the unique serial number of the programmed card and indicating that the programmed card will be sent to the kiosk 12 (step 120).

The owner or operator of the authorization database 16 then mails the programmed card to the operator of the retail establishment 18 in which the kiosk 12 is housed (step 120).

Figure 3:
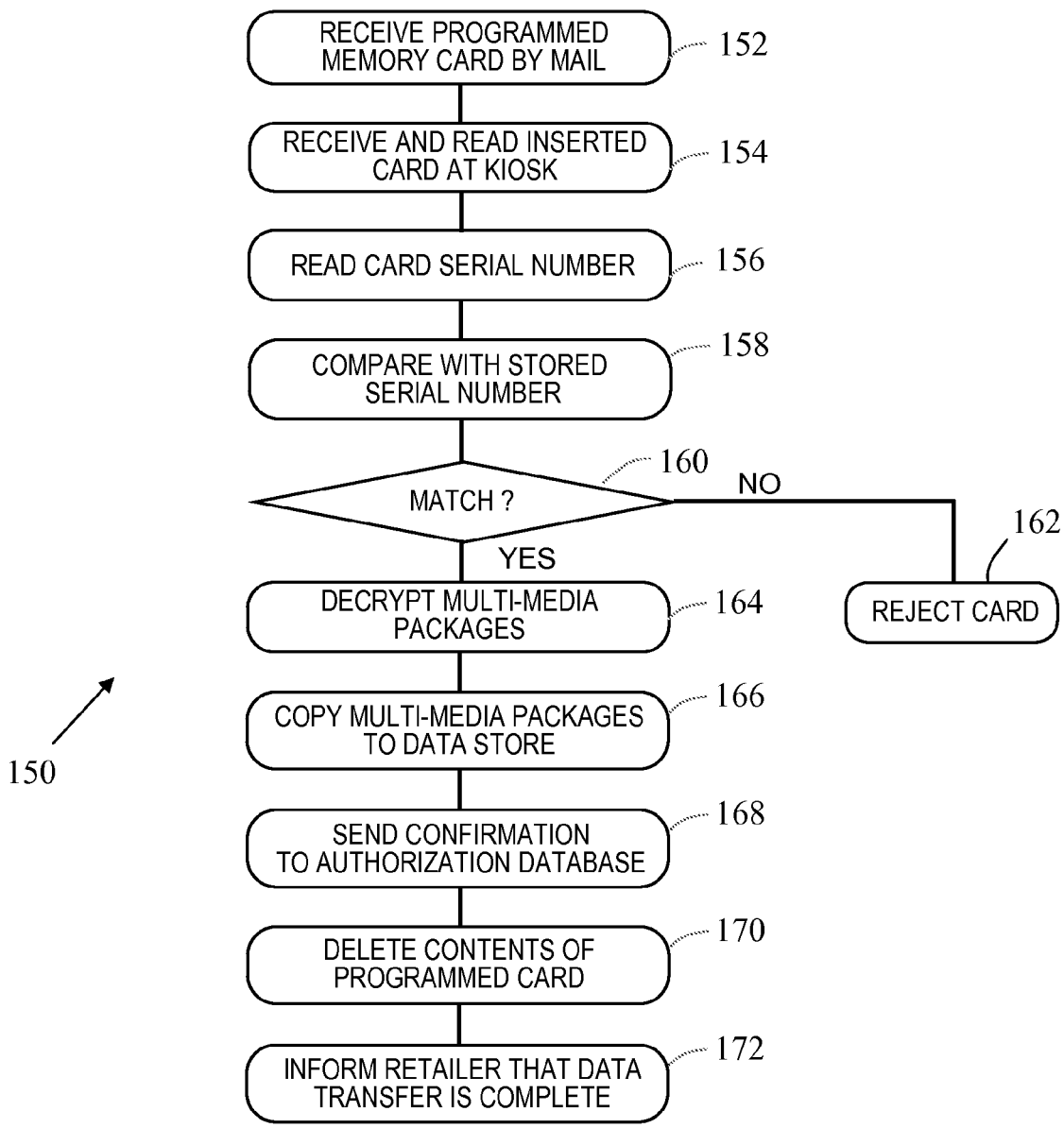
FIG. 3 is a flowchart illustrating steps implemented by or at another part of the system of FIG. 1 (a kiosk and the content server) to update multi-media content in the content server of the system of FIG. 1.

Reference will now be made to FIG. 3, which is a flowchart 150 illustrating steps implemented by or at the local content system (that is, the kiosk 12 and the content server 14) to update multi-media content in the content server 14.

The owner or operator of the retail establishment 18 receives the programmed card via the mail (step 152).

The owner or operator of the retail establishment 18 then inserts the programmed card into the memory card reader/writer 26 of the kiosk 12, which is read by the kiosk (step 154).

The control application 34 then ascertains if authorized multi-media content is stored on the programmed card by reading the unique serial number from the programmed card (step 156), accessing the serial number received from the message sent at step 120 (step 158), and comparing the two serial numbers (step 160).

If the serial numbers do not match, then the control application 34 rejects the programmed card and informs the retailer (via the display 20) that the card is not valid and should be removed (step 162).

If the serial numbers match, then the multi-media content on the programmed card is deemed to be valid and the multi-media packages are decrypted by the control application 34 (step 164).

The decrypted multi-media packages are then copied to the content server 14 (via the LAN adapters 28,46) (step 166) for storage on the data store 40.

The control application 34 then sends a confirmation message to the authorization database 16 (via the cellular transceiver 30 and the communications facility 50) to inform the authorization database 16 that the programmed card was received and the data store 40 was updated with the contents of the programmed card (step 168).

The control application 34 then optionally deletes the contents of the programmed card to create a blank card (step 170).

The control application 34 (which is responsible for presenting a graphical user interface on the display 20) then informs the retailer (or the staff member who inserted the programmed card) via the display 20 that the transfer from the programmed card has been completed (step 172).

The retailer (or staff member) can then remove the card and mail it back to the owner or operator of the authorization database. Alternatively, the retailer may leave the card for collection by a service engineer next time the service engineer visits the kiosk 12.

The authorization database 16 may use the catalogue and inventory application 58 to confirm that the multi-media content that was transferred by the programmed card has actually been added to the data store 40 of the content server 14.

The updating process described above does not affect how the kiosk 12 is used by a customer. The operation of the kiosk 12 by a customer proceeds in a conventional manner. The only difference is that after the updating process additional multi-media titles are available (the new ones that have been transferred from the programmed card) and some other titles may no longer be available (if they have been deleted in response to step 108).

A customer can insert a secure blank FLASH SDHC card into the memory card reader 26, navigate through different multi-media content (using a GUI presented by the control application 34) and select a desired title (such as a movie).

The customer can then pay either to rent the movie or to buy the movie using a credit or debit card swiped through the magnetic stripe card reader 24.

Once the transaction has been authorized via the payment authorization application 54, the kiosk 12 will access the associated multi-media package from the data store 40, and request a DRM code from the DRM issuance and tracking application 56. The DRM code will be configured for unlimited playing of the multi-media package (in the event of a purchase) or for limited playing (in the event of a rental) of the multi-media package.

The control application 34 then copies the multi-media package to the customer's blank FLASH SDHC card and includes the retrieved DRM code to allow the customer to play the multi-media package.

It should now be appreciated that this embodiment has the advantage that there is no need for an expensive high bandwidth communication channel between the authorization database and the kiosk.

Various modifications may be made to the above described embodiment within the scope of the invention, for example, in other embodiments, each multi-media package may comprise only one file. In other embodiments, multi-media packages may relate to audio files, audio-visual files, computer software, or the like.

In other embodiments, the kiosk 12 may determine which multi-media packages should be deleted if there is insufficient storage space in the data store 40 to add the new multi-media packages.

In other embodiments, the authorization database 16 may not include a payment authorization application 54; payment authorization may be performed by a payment server.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

What is claimed is:

1. A method of updating multi-media content at a digital download kiosk, the method comprising:
    receiving a secure portable memory card into a reader/writer of secure portable memory cards in the kiosk;
    reading the secure portable memory card and confirming that authorized multi-media content is stored thereon by verifying that a previously saved serial number stored on the kiosk matches an obtained serial number of the secure portable memory card, wherein reading further includes decrypting, by the kiosk, the multi-media content, wherein the multi-media content is encrypted on the secure portable memory card;
    uploading the multi-media content from the secure portable memory card to a data store accessible by the kiosk, wherein the data store is co-located with the kiosk within a retail establishment but the data store is separate from the kiosk and accessible over a local-area network connection to the kiosk;
    indicating when the multi-media content has been uploaded;
    deleting, by the kiosk, the multi-media content from the secure portable memory card by creating a blank card of the secure portable memory card; and
    indicating, by the kiosk, that the multi-media content is now available from the kiosk upon successful upload.

2. A method according to claim 1, wherein the method comprises the further steps of:
    prior to the uploading step, ascertaining the amount of storage space required on the data store accessible by the kiosk to enable uploading of the authorized multi-media content;
    in the event of insufficient storage space on the data store, deleting currently stored multi-media content from the data store according to a deletion criterion to free up the amount of storage space required for the authorized multi-media content.

3. A method according to claim 1, wherein the step of receiving a secure portable memory card into a reader/writer of secure portable memory cards in the kiosk comprises receiving a secure, solid state, non-volatile memory card.

4. A method according to claim 1, wherein the step of reading the secure portable memory card to ascertain if authorized multimedia content is stored thereon includes ascertaining if the multi-media content stored thereon includes digital rights management (DRM) technology identical to the DRM technology used by the currently stored multi-media content.

5. A method according to claim 1, wherein the method comprises the further step of informing a remote authorization database if an expected secure portable memory card having a serial number has not been received within a predefined time period of receiving notification that a portable memory card having that serial number has been sent to the kiosk.

6. A method according to claim 1, wherein the step of reading the secure portable memory card to ascertain if authorized multimedia content is stored thereon includes ascertaining if the multi-media content stored on the portable memory card is protected using predefined cryptographic techniques.

7. A method according to claim 1, wherein the step of reading the secure portable memory card includes using the same reader/writer of secure portable memory cards to read the portable memory card storage device as is used to write multi-media content to a portable memory card storage device provided by a customer.

8. A method according to claim 1, wherein the data store accessible by the kiosk is located in a content server connected to, but separate from, the kiosk.

9. A method according to claim 1, wherein the step of indicating when the authorized multi-media content has been uploaded may further comprise presenting a screen on a display of the kiosk informing a user who inserted the secure portable memory card that the multi-media content has been successfully transferred to the kiosk.

10. A method according to claim 1, wherein the method further comprises removing the portable memory card from the portable storage device reader/writer, and returning the removed portable memory card to a supplier by mail.

11. A method of updating multi-media content at a digital download kiosk, the method comprising:

receiving a secure portable flashcard into a reader/writer of secure portable as flashcards in the kiosk;

reading the secure portable flash card to ascertain if authorized multi-media content is stored thereon by confirming that a previously saved serial number on the kiosk matches an obtained serial number for the secure portable flash card, wherein reading further includes decrypting, by the kiosk, the multi-media content, wherein the multi-media content is encrypted on the secure portable flash card;

uploading the multi-media content from the secure portable flash card to a data store accessible by the kiosk using a local-area network connection where the data store is co-located with the kiosk within a retail establishment but the data store is separate from the kiosk;

indicating when the multi-media content has been upload;

deleting, by the kiosk, the multi-media content from the secure portable flash card by creating a blank card of the secure portable flash card; and indicating, by the kiosk, that the multi-media content is available from the kiosk after successful uploading.

* * * * *